(12) United States Patent
Kang

(10) Patent No.: US 6,422,851 B2
(45) Date of Patent: Jul. 23, 2002

(54) APPARATUS FOR FABRICATING COLOR SLIDE FASTENERS

(76) Inventor: Young-Chul Kang, 317-4 Jaeil-Ri, Yangji-Myun, Yongin-Si, Kyunggi-Do (KR)

( * ) Notice: Subject to any disclaimer, the term of this patent is extended or adjusted under 35 U.S.C. 154(b) by 0 days.

(21) Appl. No.: 09/797,771

(22) Filed: Mar. 1, 2001

Related U.S. Application Data

(62) Division of application No. 09/215,716, filed on Dec. 17, 1998, now Pat. No. 6,279,209.

(30) Foreign Application Priority Data

| May 7, 1998 | (KR) | ............................................. 98-7326 |
| May 7, 1998 | (KR) | ............................................. 98-16328 |
| Sep. 8, 1998 | (KR) | ............................................. 98-37001 |
| Sep. 8, 1998 | (KR) | ............................................. 98-37002 |

(51) Int. Cl.$^7$ .................. B29C 70/68; B29C 45/14; B29C 45/22; B29D 5/00
(52) U.S. Cl. .................. 425/116; 29/410; 264/252; 425/120; 425/121; 425/545; 425/557; 425/561; 425/572; 164/316; 164/332
(58) Field of Search ................... 264/252; 425/545, 425/120, 121, 557, 561, 116, 572; 164/316, 332; 29/410; 249/111

(56) References Cited

U.S. PATENT DOCUMENTS 2,074,368 A * 3/1937 Corner
2,227,461 A * 1/1941 Morin et al.
2,891,282 A * 6/1959 Neitlich
4,235,584 A * 11/1980 Yunoki ........................ 425/545
4,690,629 A * 9/1987 Horikawa ................... 425/557
4,962,580 A * 10/1990 Matsuda ...................... 29/410
5,096,411 A * 3/1992 Gellert ........................ 425/572
5,431,554 A * 7/1995 Yoshida et al. ............. 425/545
5,641,526 A * 6/1997 Gellert ........................ 425/572
5,707,664 A * 1/1998 Mak ............................ 425/572

FOREIGN PATENT DOCUMENTS

GB    2177967 A   *  2/1987

* cited by examiner

*Primary Examiner*—Robert Davis
(74) *Attorney, Agent, or Firm*—Roth & Goldman

(57) ABSTRACT

The method includes the steps of a tape arranging step for arranging a support tape of a slide fastener on a mold having a capacity having a plurality of unit fastening element molding material grooves for molding a plurality of unit fastening elements, a molding material heating and discharge step for separating a molding material of more than two colors from a source material supply unit by the colors by a molding material injection means and then heating and discharging the same, a moving step for grouping external molding material flow paths from the molding material supply unit to an injection port of the mold into more than two groups and then moving different colors molding material by the colors, and an injection step for injecting the molding material into the unit fastening element molding material groove through a plurality of inject-on ports formed in the mold.

10 Claims, 19 Drawing Sheets

APPARATUS FOR FABRICATING COLOR SLIDE FASTENERS

This is a division of application Ser. No. 09/215,716, filed Dec. 17, 1998 and now U.S. Pat. No. 6,279,209.

BACKGROUND OF THE INVENTION

1. Field of the Invention

The present invention relates to a color slide fastener and method and apparatus for fabricating the same, and in particular, to an improved color slide fastener and a method and apparatus for fabricating the same which are capable of easily injection-molding unit fastening elements (tooth of fastener) of a slide fastener in more than two colors for thereby diverging the design of various clothes, bags and portable things and implementing various design choices.

2. Description of the Conventional Art

Generally, the slide fastener is widely used for various products. A plurality of unit fastening elements are longitudinally fixed to a pair of support tapes (cloth tapes), respectively, for thereby implementing a fastening or unfastening operation, so that a predetermined portion of the product adapting the fastener is opened or closed.

The conventional slide fastener is formed of a support tape made of a pair of cloth pieces, and the unit fastening element and slider are formed of a synthetic resin or metal. The support tape, unit fastening element and slide are formed in a single color and single pattern.

In the conventional slide fastener, since the support tape and the unit fastening element are formed in the single color and single pattern, such pattern is different from the pattern of the cloth for thereby generating a pattern mismatching portion, so that a mismatching pattern and design in clothes, bags and portable things are formed. Therefore, there is a limit to implement various fashion and colorful design, so that a user's personality and design choice capability are decreased. In addition, a design choice range is limited.

Therefore, as the use of slide fastener is increased, the demand for the color slide fastener having various colors and designs is increased.

SUMMARY OF THE INVENTION

Accordingly, it is an object of the present invention to provide a color slide fastener and a method and apparatus for fabricating the same which overcome the aforementioned problems encountered in the conventional art.

It is another object of the present invention to provide a color slide fastener and a method and apparatus for fabricating the same which are capable of easily injection-molding a unit fastening element (tooth of fastener) of a slide fastener in more than two colors for thereby diverging the design of various clothes and portable things and enlarging a design choice.

In order to achieve the above objects, there is provided a method for fabricating a color slide fastener which includes the steps of a tape arranging step for arranging a support tape of a slide fastener on a mold having a plurality of unit fastening element molding grooves for molding a plurality of unit fastening elements, a molding material heating and discharge step for separating a molding material of more than two colors from a source material supply unit by the colors by a molding material injection means and then heating and discharging the same, a moving step for grouping external molding material flow paths from the molding material supply unit to an injection port of the mold into more than two groups and then moving different colors molding materials by the colors, an injection step for injecting the molding material into the unit fastening element molding material groove through a plurality of injection ports formed in the mold, and a cooling and extracting step for cooling and extracting the unit fastening element engaged with the support tape.

In order to achieve the above objects, there is provided an apparatus for fabricating a color slide fastener according to a first embodiment of the present invention which includes a multiple colors molding material means for molding a plurality of unit fastening elements in more than two colors engaged with a support tape of a slide fastener.

In order to achieve the above objects, there is provided an apparatus for fabricating a color slide fastener according to a second embodiment of the present invention which includes more than two unit fastening elements grouped into a predetermined number of groups in a slide fastener in which a plurality of unit fastening elements are fixed to a support tape, and a slider is engaged to the unit fastening elements.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 1 through 6 are views for explaining a color slide fastener fabrication method and apparatus according to an embodiment of the present invention, of which:

FIG. 1 is an exploded perspective view illustrating a fabrication apparatus;

FIG. 2 is a cross-sectional view illustrating a fabrication apparatus;

FIG. 3 is a perspective view illustrating a color slide fastener fabricated according to the present invention;

FIGS. 7 through 11 are views illustrating a method and apparatus for fabricating a color slide fastener according to another embodiment of the present invention;

FIG. 7 is an exploded perspective view illustrating a fabrication apparatus;

FIG. 10 is an exploded perspective view illustrating a guide tube for guiding a molding material injection of another embodiment of the present invention;

FIG. 11 is a cross-sectional view illustrating the guide tube of FIG. 10;

DETAILED DESCRIPTION OF THE INVENTION

Figure 1:
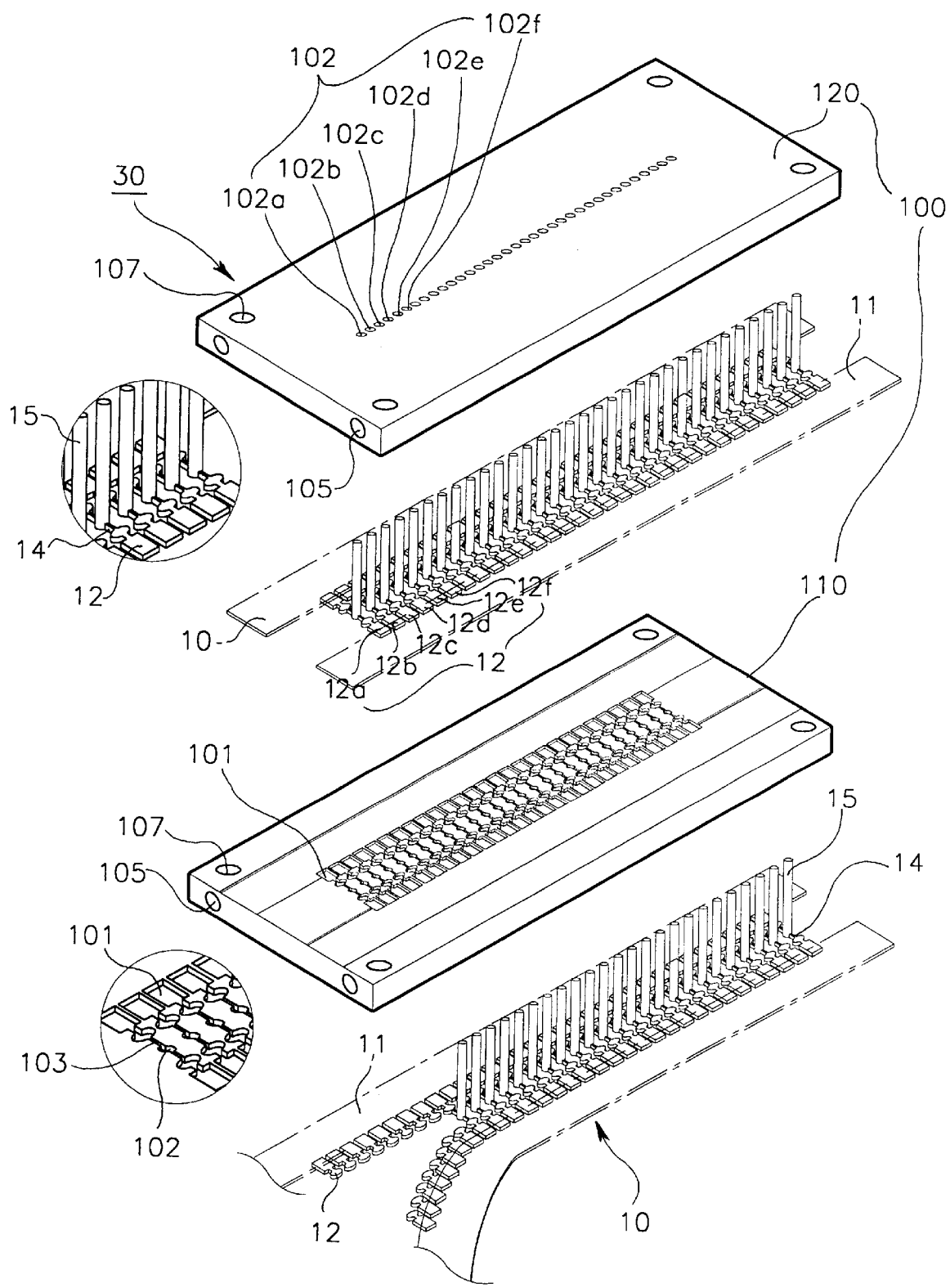
Figure 2:
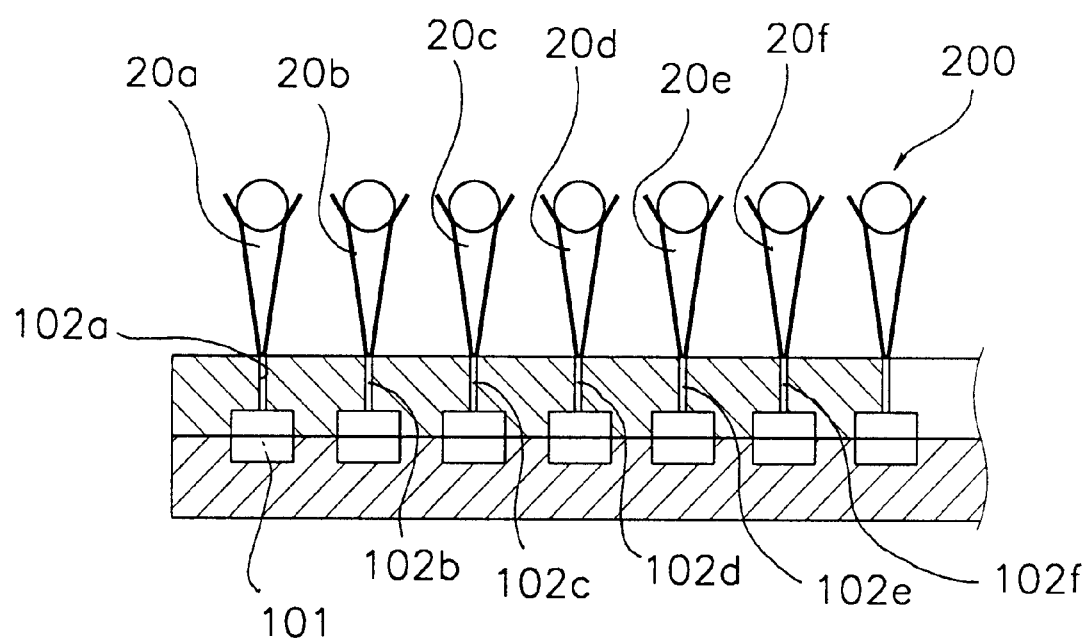
Figure 3:
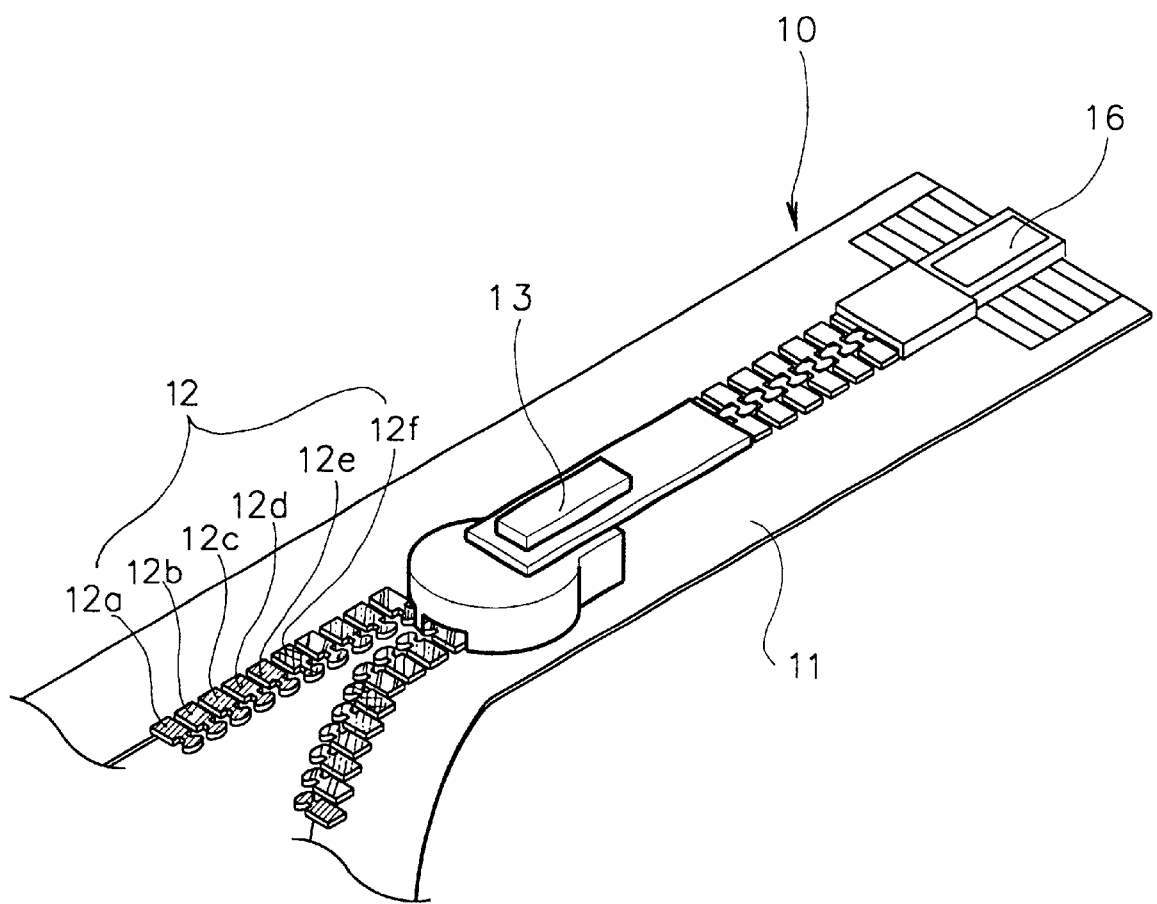
Figure 4A:
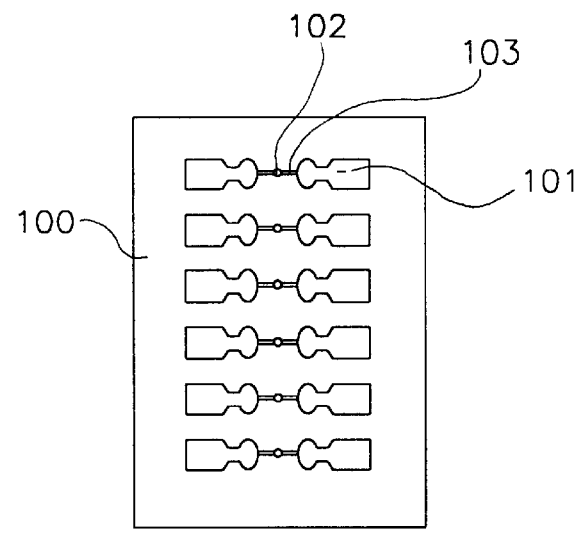
FIG. 4A is a plan view illustrating one type of a mold.
Figure 4B:
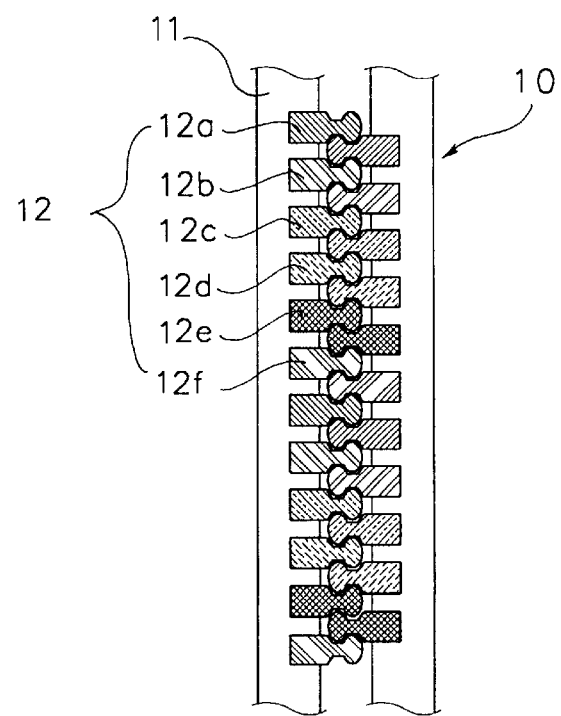
FIG. 4B is a plan view illustrating a color slider fastener fabricated by the mold shown in FIG. 4A.
Figure 5A:
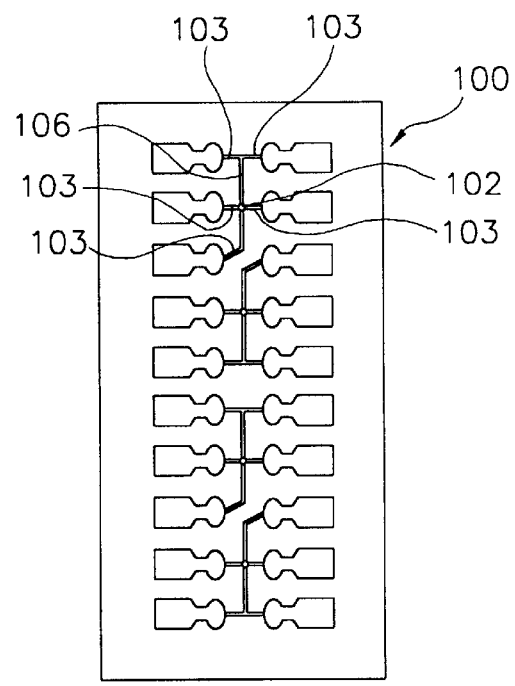
FIG. 5A is a plan view illustrating another type of a mold.
Figure 5B:
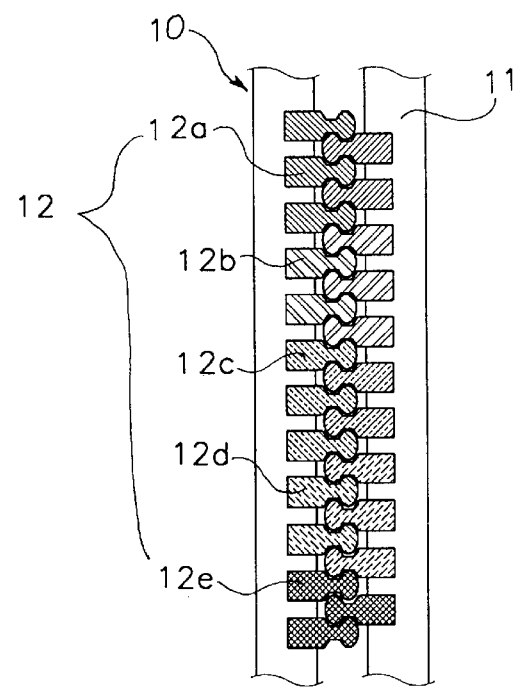
FIG. 5B is a plan view illustrating a color slide fastener fabricated by the mold as shown in FIG. 5A.
Figure 6A:
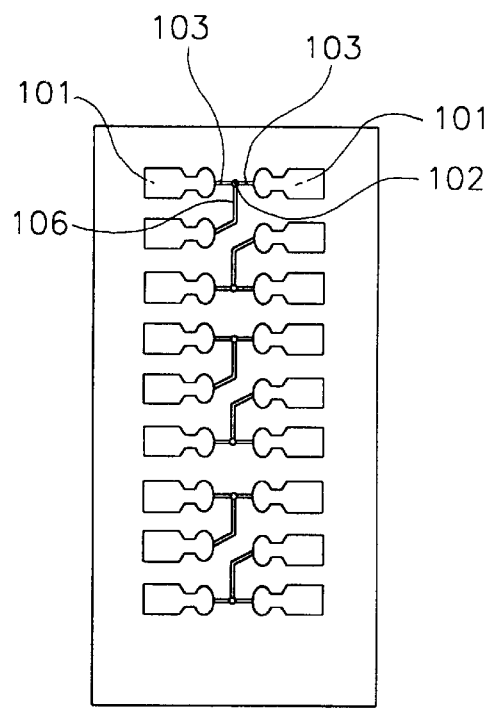
FIG. 6A is a plan view illustrating another type of a mold.
Figure 6B:
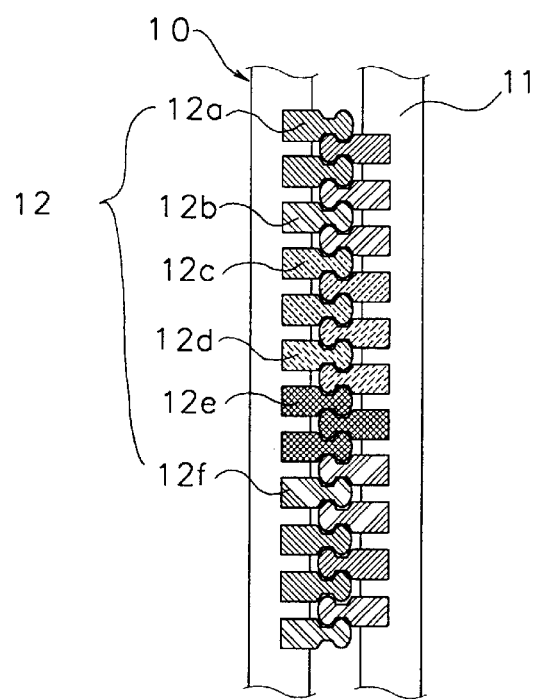
FIG. 6B is a plan view illustrating a color slide fastener fabricated by the mold as shown in FIG. 6A.

FIGS. 1 through 6 are views for explaining a color slide fastener fabrication method and apparatus according to an embodiment of the present invention, of which, FIG. 1 is an exploded perspective view illustrating a fabrication apparatus, FIG. 2 is a cross-sectional view illustrating a fabrication apparatus, FIG. 3 is a perspective view illustrating a color slide fastener fabricated according to the present invention, FIG. 4A is a plan view illustrating one type of a mold, FIG. 4B is a plan view illustrating a color slider fastener fabricated by the mold shown in FIG. 4A, FIG. 5A is a plan view illustrating another type of a mold, FIG. 5B is a plan view illustrating a color slide fastener fabricated by the mold as shown in FIG. 5A, FIG. 6A is a plan view illustrating another type of a mold, and FIG. 6B is a plan view illustrating a color slide fastener fabricated by the mold as shown in FIG. 6A.

As shown therein, the slide fastener 10 according to the present invention includes a pair of support tapes 11, a plurality of unit fastening elements (fastener teeth) 12 longitudinally formed on the support tape 11 in more than two colors, and a slider 13 for fastening and unfastening the unit fastening elements 12.

The unit fastening elements 12 are formed to have various colors and are arranged on the support tapes 11 by a predetermined number of the same. For example, each of the pairs of red, orange, yellow, green, blue and purple unit fastening elements 12; 12a, 12b, 12c, 12d, 12e, 12f is sequentially arranged.

The slide fastener fabrication method according to the present invention includes a tape arranging step for arranging the support tapes 11 of the slide fastener 10 to the mold 100 having a capacity having a plurality of unit fastening element molding material grooves 101 for molding a plurality of unit fastening elements 12, a mold heating and injection step, a transfer step for delivering molding material to the injection ports 102 of the mold 100, an injection step for injecting the molding material 20 into the unit fastening element molding material groove 101 through a plurality of injection ports 102, and a cooling and discharging step for cooling the unit fastening elements 12 engaged with the support tape 11 and then discharging the same.

In the injection step, the internal molding material flow path from the injection port 102 of the mold 100 to the unit fastening element molding material groove 101 are divided into more than two groups, and the molding material 20 of different colors is injected into each injection port 102 of the internal molding material flow path of the mold 100, so that the unit fastening elements 12 of different colors are sequentially formed on the support tape 11 of the slide fastener 10.

In more detail, in the fabrication method according to the present invention, the unit fastening element molding material groove 101 having the same shape as the unit fastening element 12 of the slide fastener 10 is longitudinally formed, and the injection port 102 is formed in each unit fastening element molding material groove 101 for guiding the injection of the molding material 20, and the support tape 11 is inserted into the mold 100, and the molding materials 20 in a liquid state and gel state having various colors are sequentially injected into the injection port 102 of the mold 100 by the colors. For example, red molding material 20a is injected into the first injection port 102a, orange molding material 20b is injected into the second injection port 102b, yellow molding material 20c is injected into the third injection port 102c, green molding material 20d is injected into the fourth injection port 102d, blue molding material 20e is injected into the fifth injection port 102e, and purple molding material 20f is injected into the sixth injection port 102f, so that various colors of the molding materials 20 are filled into the unit fastening element molding material groove 101 of the mold 100, and thus various colors of the unit fastening elements 12 are sequentially molded on the support tape 11 of the slide fastener 10.

Thereafter, the support tape 11 is separated from the mold 100, and a runner molding material unit 14 and a gate stick 15 formed continuously with the unit fastening element 12 formed on the support tape 11 are separated from the unit fastening element 12 and then are cut at a predetermined interval, and a fixing portion 16 is fixed to the end portion, respectively, and the slide fastener 10 having various colors of the unit fastening element 12 are fabricated.

In the fabrication apparatus of the color slide fastener according to the present invention, there is provided a multiple color molding material unit 30 for forming a plurality of unit fastening elements 12 fixed to the support tape 11 of the slide fastener 10 in multiple colors.

The mold 100 of the multiple color molding material unit 30 is formed separately from the upper mold 120 and the lower mold 110 for implementing an easier insertion and extraction of the support tape 11. There is formed a cooling water flow path 105 through which a cooling water flows so that the molding material 20 in a hot liquid state or gel state filled in the unit fastening element molding material groove 101 of the mold 100 is quickly cooled for thereby forming the molding material 20 to the shape of the unit fastening element 12 at a room temperature. In addition, a bolt hole 107 is formed in each corner portion (four corners) of the upper mold 120 and the lower mold 110.

In addition, the support tape 11 may be formed of various materials such as cloth, fur, synthetic resin, etc., and the molding material 20 which is a material for forming the unit fastening element 12 may be formed of a synthetic resin as well as a metallic material such as aluminum.

The mold 100 is formed a number of guide grooves 103 and a plurality of unit fastening element molding material grooves 101, and each guide groove 103 of a group of from 2~20 communicate with a connection groove 106 and with each other, and an injection port 102 communicates with each connection groove 106. When various color molding materials 20 are injected into the injection ports 102, each molding material 20 is injected into the unit fastening element molding material groove 101 through the connection groove 106 and the guide groove 103, so that a predetermined unit of unit fastening elements 12 are sequentially formed on the support tape 11 in different colors by the pair.

FIGS. 4A, 5A and 6A illustrate another type of the arrangement of the unit fastening element molding material groove 101 in the mold 100. For example, as shown in FIG. 4A, a pair of the unit fastening element molding material grooves 101 are arranged by one group at both rows. As shown in FIG. 5A, two unit fastening element molding material grooves 101 arranged in one row and three unit fastening element molding material grooves 101 arranged in other row are arranged as one group, and three unit fastening element molding material grooves 101 arranged in one row and two unit fastening element molding material grooves 101 arranged in the other row are arranged by one group. The above-described arrangement is repeated. As shown in FIG. 6A, two unit fastening element molding material grooves 101 arranged in one row and one unit fastening element molding material groove 101 arranged in one row are arranged as one group, and one unit fastening element molding material groove 101 arranged in one row and two unit fastening element molding material grooves 101 arranged in the other row are arranged as one group. Namely, the fastening construction is formed of two pairs of the same.

When various color molding materials 20 are injected into the injection ports 102 formed in the mold 100, it is preferred to inject different color of molding materials 20 are injected into the injection port 102. In addition, a plurality of molds 100 are arranged on the table on which the molding material injection unit 200 for injecting different colors of the molding materials 20 are prepared, and then the table is moved. As the table is being moved, the molding material injection unit 200 sequentially injects the molding material 20 into the injection port 102 of the mold 100.

In the color slide fastener fabricated according to the present invention, the pattern of the clothes, the pattern of the support tape 11 and the pattern of the unit fastening elements 12 may be differently formed. In addition, the patterns of the same may be formed identically.

In the case that a conventional slide fastener is used for the clothes, since the pattern of the support tape 11 and the unit fastening elements 12 of the slide fastener 10 are significantly different from the pattern of the basic cloth for thereby forming a pattern mismatching portion, so that the designs of the clothes are not matched in accordance with the kinds of the clothes, bags, and portable things, and the design choice range is limited. However, in the present invention, the colors and patterns of the slide fastener may be variously, so that it is possible to enhance the design choice range in accordance with the kinds of clothes.

Figure 7:
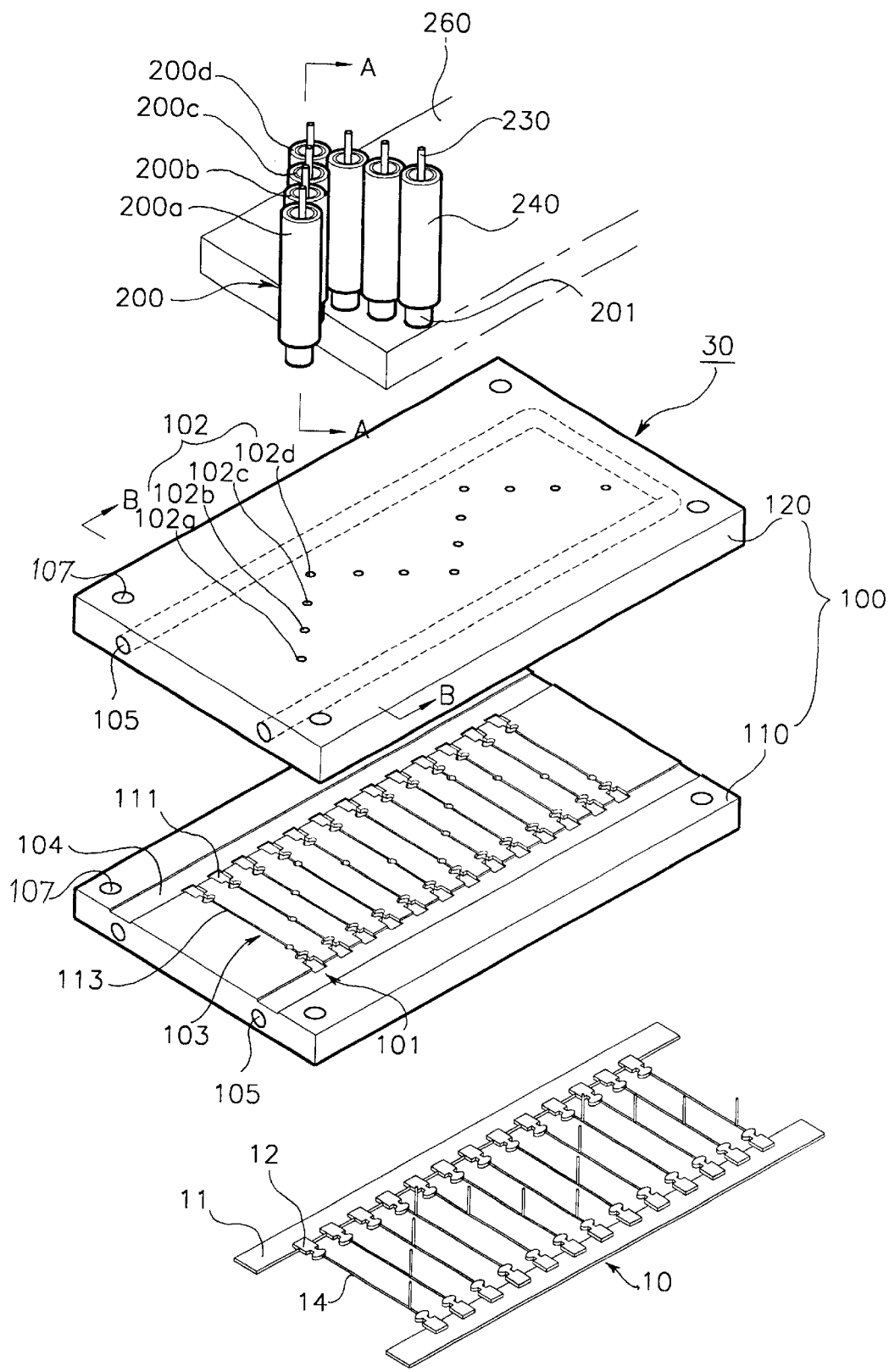
Figure 8A:
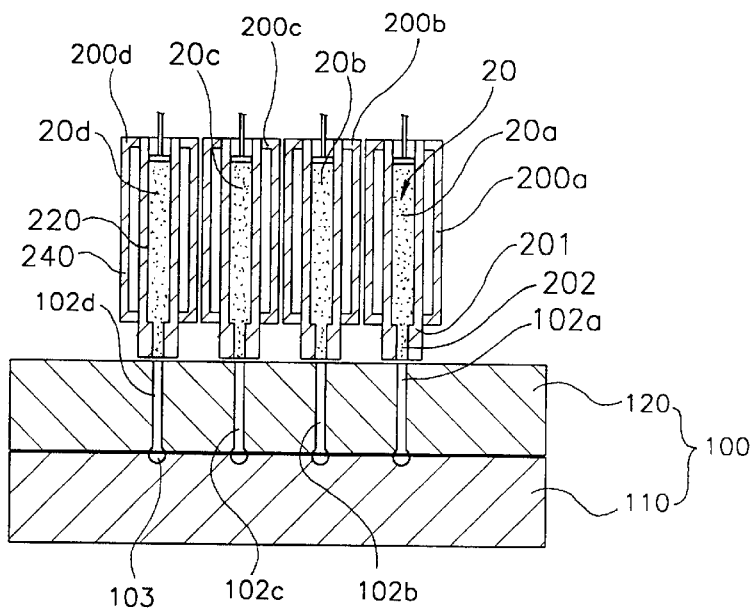
FIGS. 8A and 8B are partial cross-sectional views of the fabrication apparatus.
Figure 8B:
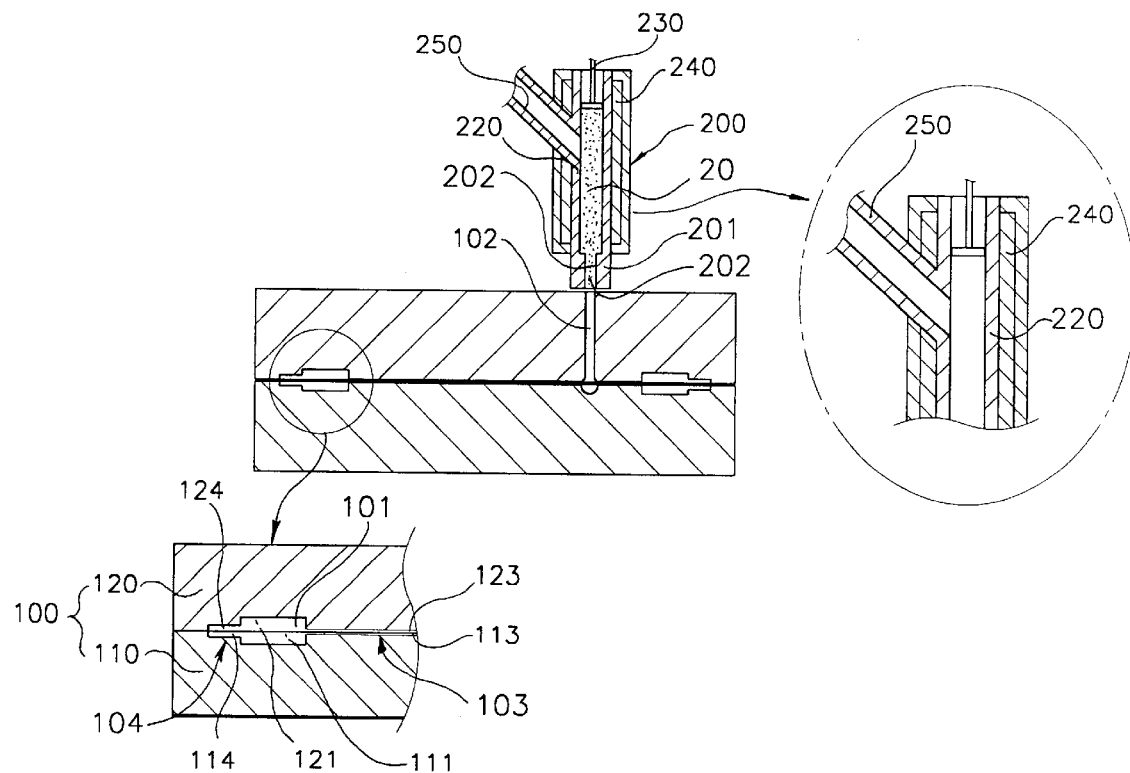
Figure 9A:
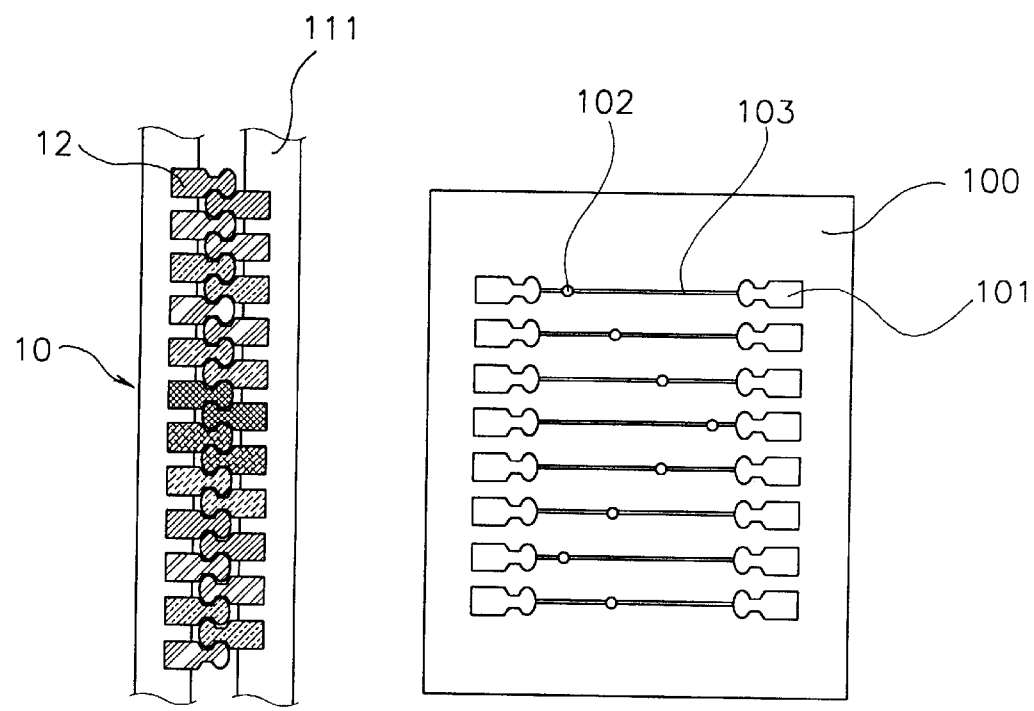
FIGS. 9A, 9B and 9C are plan views illustrating another type of a mold and a color slide fastener.
Figure 9B:
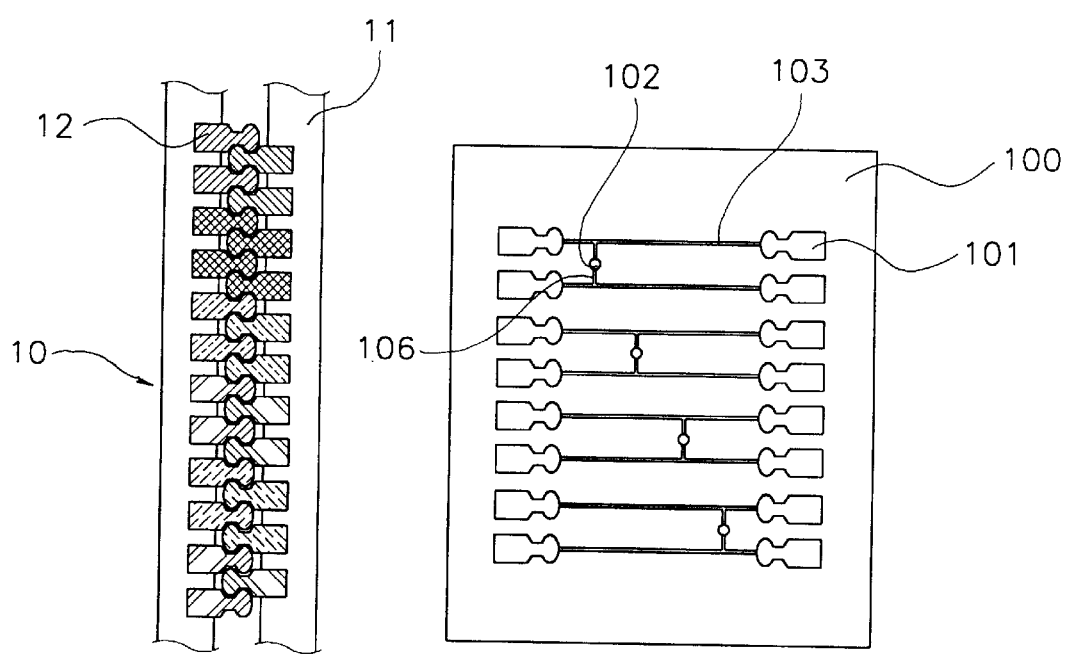
Figure 9C:
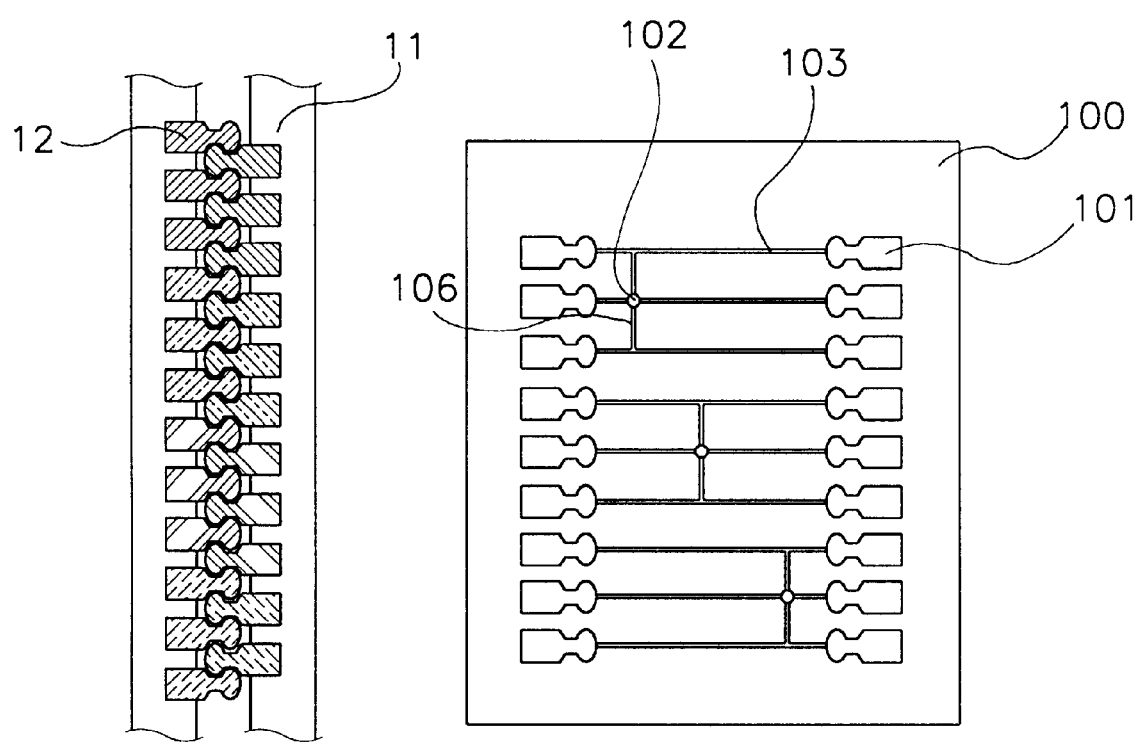
Figure 10:
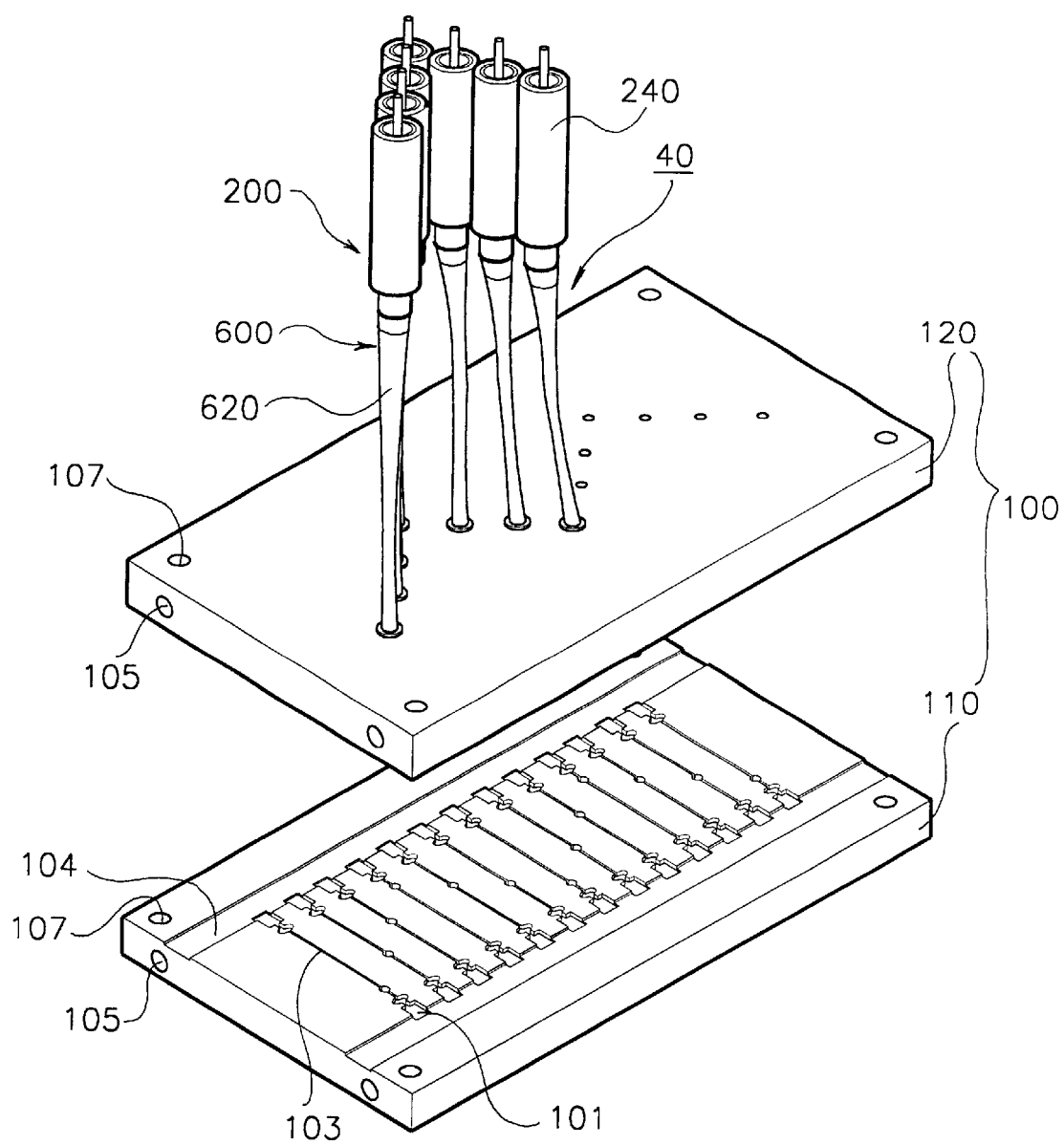
Figure 11:
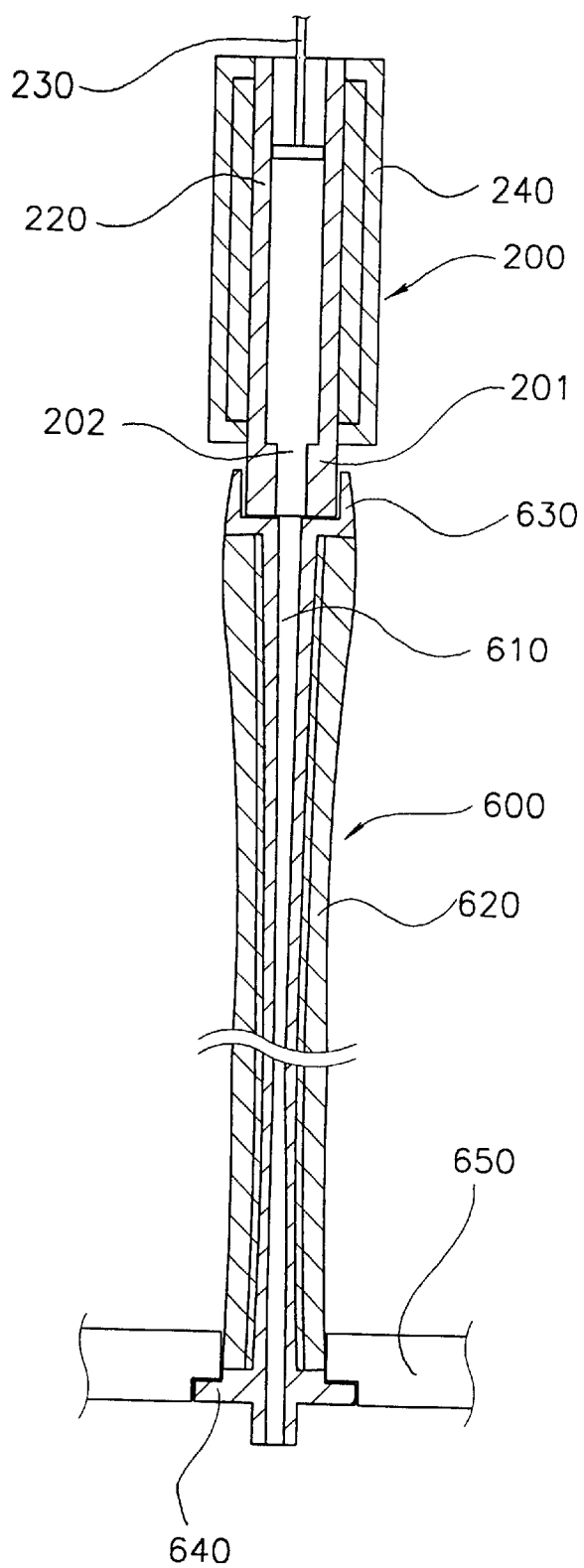

FIGS. 7 through 11 are views illustrating the color slide fastener fabrication method and apparatus according to another embodiment of the present invention. FIG. 7 illustrates an exploded perspective view of the fabrication apparatus, and FIGS. 8A and 8B are cross-sectional views taken along line A—A of FIG. 7 and along line B—B of the same, respectively, and FIGS. 9A, 9B and 9C are plan views illustrating other types of molds and color slide fasteners, FIG. 10 is an exploded perspective view illustrating a guide tube for guiding a molding material injection of another embodiment of the present invention, and FIG. 11 is a cross-sectional view illustrating a guide tube of FIG. 10.

As shown in FIGS. 7, 8A and 8B, in the color slide fastener according to another embodiment of the present invention, there is provided a mold 100 in which a plurality of unit fastening element molding material grooves 101 having the same shape as the unit fastening elements 12 of the slide fastener 10 are longitudinally formed inside the same, and the injection ports 102 into which the molding material 20 is injected are arranged in the upper portion in zig-zag form, and the unit fastening element molding material groove 101 and the injection ports 102 communicate with the guide groove 103. In addition, there is further provided a plurality of molding material injection units 200 containing various color molding materials 20 for selectively injecting the same into the injection ports 102 formed in the mold 100. As shown in FIG. 10, more preferably, a molding material guide unit 40 may be formed for guiding the molding material 20 from the molding material injection unit 200 to the injection ports 102 of the mold 100.

In the mold 100, a plurality of lower molding material grooves 111 are longitudinally formed at both sides of the upper portion of the same, and there is provided a lower mold 110 in which lower fastening grooves 114 engaged with the support tape 11 are longitudinally formed on the lower molding material grooves 111, and a lower guide groove 113 connecting the lower molding material grooves 111 are formed in the intermediate portions of the same. A plurality of upper molding material grooves 121 mating with the lower molding material grooves 111 of the lower molding material 110 are longitudinally formed at both sides of the lower portion. The upper fastening groove 124 mating with the lower fastening groove 114 of the lower mold 110 is formed in one side of the upper molding material groove 121. In the intermediate portion, the upper guide grooves 123 mating with the lower guide groove 113 of the lower mold 110 are formed. In the upper portion, an upper mold 120 is formed by a plurality of injection ports 102 which are formed in zig-zag form and communicate with the upper guide grooves 123 so that the molding material 20 is injected into the upper guide groove 123.

A cooling water flow path 105 is formed in a predetermined portion of the mold 100 so that the molding material 20 filled in the unit fastening element molding material grooves 101 are quickly cooled for thereby shaping the molding material 20 to the shape of the unit fastening element 12.

The guide grooves 103 communicating with the unit fastening element molding material grooves 101 of the mold 100 for guiding the molding material 20 injected into the injection port 102 of the mold 100 toward the unit fastening element molding material groove 101 may be formed to be independently to match with the injection ports 102, so that the unit fastening elements 12 have different colors as shown in FIG. 9A. As shown in FIGS. 9B and 9C, a predetermined number of guide grooves 103 are grouped to be matched with one injection port 102 and to communicate with the connection groove 106, so that a predetermined number of unit fastening elements 12 have the same colors as one group.

Figure 12A:
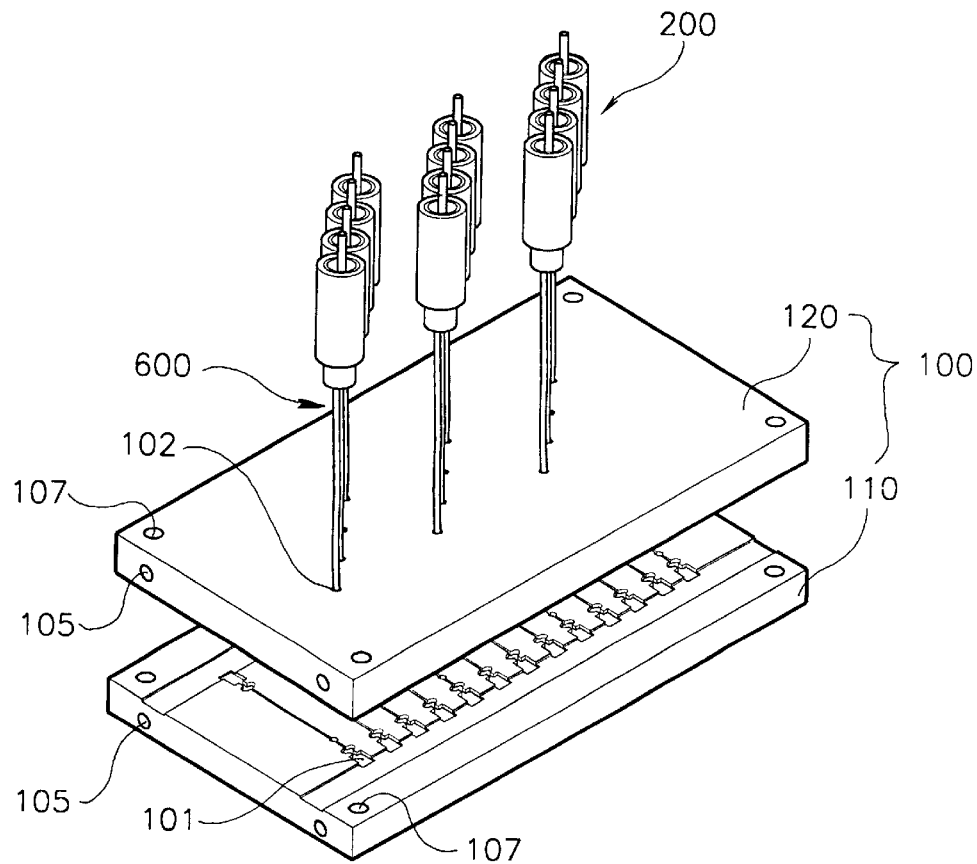
FIGS. 12A, 12B and 12C are exploded perspective views illustrating various examples of a guide tube.
Figure 12B:
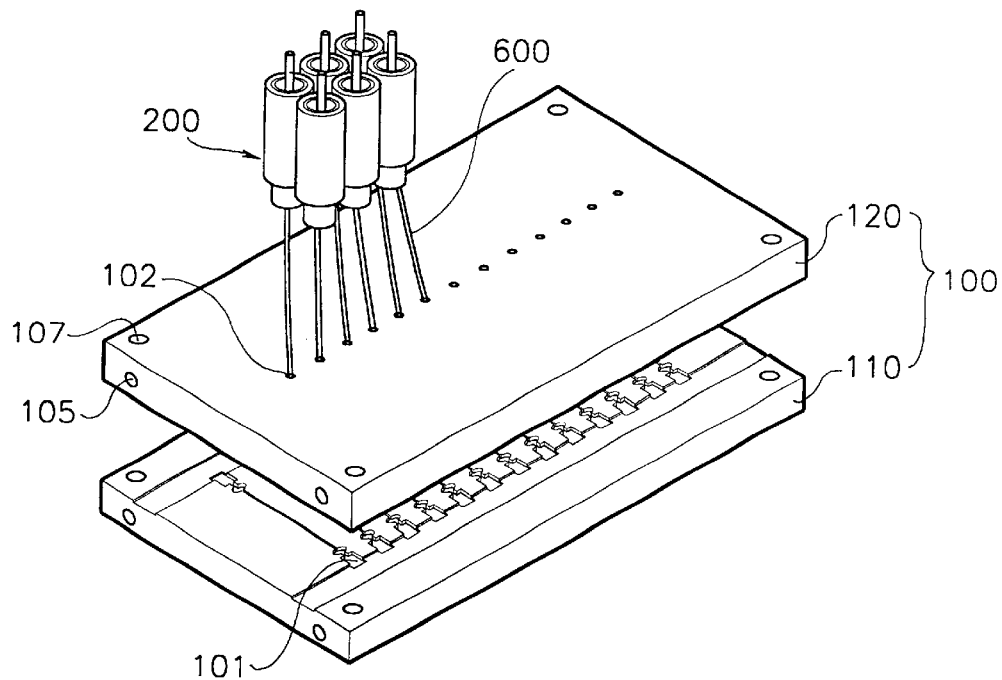
Figure 12C:
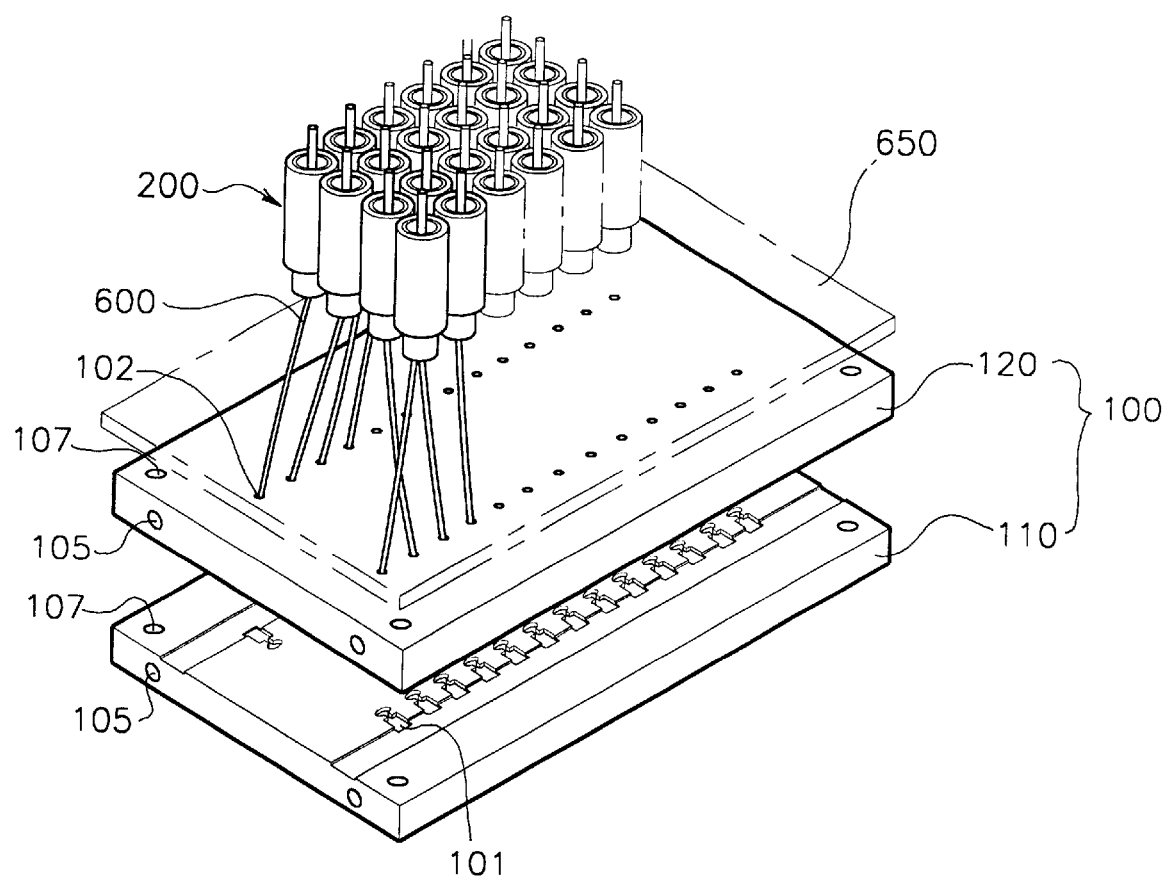

In addition, as shown in FIG. 12C, the guide grooves 103 formed in the lower mold 110 and upper mold 120 of the mold 100 may be removed. Instead of the formation of the guide grooves 103, the unit fastening element molding material grooves 101 may be separated from each other, and the injection ports 102 formed in the upper mold 120 may directly communicate with the unit fastening element molding material grooves 101.

As shown in FIGS. 7 and 8, various color molding materials 20 are inserted into the molding material injection unit 200, and a cylinder 220 having a nozzle 201 is formed in the molding material injection unit 200, and a molding material pressurizing unit 230 is disposed in the interior of the cylinder 220 for pressurizing the molding material 20 in the cylinder 220 and discharging the molding material 20 through an outlet 202 of the nozzle 201. A heating unit 240 is engaged around the cylinder 220 for controlling the temperature of the molding material 20 in the cylinder 220, and a molding material supply outlet 250 is formed in a predetermined portion of the cylinder 220 for supplying the material of the molding material therethrough.

The molding material pressurizing unit 230 is formed of a screw or piston for transferring and pressurizing the molding material, and a plurality of molding material injection unit 200 is fixed to a support plate 260.

FIG. 10 is an exploded perspective view illustrating a guide tube for guiding a molding material injection of another embodiment of the present invention, FIG. 11 is a cross-sectional view illustrating a guide tube of FIG. 10, and FIGS. 12A, 12B and 12C are exploded perspective views illustrating various examples of a guide tube.

As shown in FIGS. 10 and 11, in a guide tube 600 of the molding material guide unit 40, a hollow portion 610 through which the molding material 20 passes through is formed, and a heating unit 620 is formed on an outer circumferential surface of the same for controlling the temperature of the molding material 20. An engaging portion engaged with the nozzle 201 of the molding material injection unit 200 is disposed in the upper portion of the same. A disengaging portion 640 engaged with or disengaged from the injection port 102 of the mold 100 is formed in the lower portion of the same. As shown in FIG. 12C, the disengaging portion 640 of the guide tube 600 may be fixed to the guide tube support plate 650 for being matched with the injection port 102 of the mold 100. A band-type heater is used for the heating elements 240 and 620.

As shown in FIG. 12A, the molding material injection units 200 for selectively injecting various color molding materials into the injection ports 102 of the mold 100 are grouped by a predetermined number and are regularly disposed at a predetermined slanted angle.

As shown in FIG. 12B, the injection port 102 of the mold 100 may be arranged in a straight line shape, and the molding material injection unit 200 may be arranged in two rows, so that the molding material 20 from the second row of the molding material injection unit 200 is injected into the injection port 102 of the mold 100 by the first row guide tube 600 for thereby decreasing the size of the mold 100.

As shown in FIG. 12C, the injection port 102 of the mold 100 and the molding material injection unit 200 are arranged in a predetermined row and column, so that various color molding materials 20 discharged from the molding material injection units 200 are filled into the unit fastening element molding material grooves 101 through the injection ports 102 of the mold 100 communicating with the unit fastening element molding material grooves 101 for thereby removing a step which is performed during the fabrication of the unit fastening element 12 of the slide fastener 10, namely, the runner molding material unit 14 which is formed after the unit fastening element 12 as shown in FIG. 1. In addition, it is possible to prevent the consumption of the molding material 20 which is the material of the unit fastening elements 12.

In the above-described apparatus, a material such as synthetic resin is properly injected for thereby molding material an accurate product. A heat expanding prevention groove is formed for thereby preventing the portion blocking the injection flow of the material or the portion which may deform the size of the product based on the expansion by heat. In addition, the techniques which are conventionally used for the slide fastener fabrication apparatus may be used.

FIG. 7 is an exploded perspective view illustrating a guide tube for guiding a molding material injection of another embodiment of the present invention, and FIG. 8 is a cross-sectional view illustrating a guide tube of FIG. 11.

The support tape 11 is inserted into the lower fastening grooves 114 and 124 of the upper mold 120 and the lower mold 110, so that the support tape 11 is engaged with the mold 100 and is guided.

The injection ports 102 formed in the upper mold 120 of the mold 100 closely contact with the nozzle 201 formed in the end portion of the cylinder 220 of the molding material injection unit 200 in which various color molding materials are filled.

Thereafter, the molding material pressurizing unit 230 of the molding material injection unit 200 pressurizes the molding material 20 filled in the cylinder 220, and the molding material 20 is injected into the injection ports 102 formed in the mold 100 through the discharge outlet 202 of the nozzle 201.

For example, as shown in FIGS. 8 and 9, the molding materials 20, 20a, 20b, 20c and 20d having first, second, third and fourth colors in the cylinders 220, 220a, 220b, 220c and 220d of the first, second, third and fourth molding material injection heads 200, 200a, 200b, 200c and 200d are injected into the first, second, third and fourth injection ports 102, 102b, 102c, and 102d of the mold 100.

The molding material 20 in the cylinder 220 of the molding material injection unit 200 is filled into the unit fastening element molding material grooves 101 through the discharge outlet 202 of the nozzle 201, the injection port 102 of the mold 100 and the guide groove 103.

At this time, the heating unit 240 of the molding material injection unit 200 heats the molding material 20, so that the molding material 20 in a liquid or gel state is injected into the unit fastening element molding material groove 101 of the mold 100 in the molding material injection unit 200.

When the molding material 20 filled in the unit fastening element molding material groove 101 of the mold 100 is cooled after a predetermined time, the lower mold 110 and the upper mold 120 of the mold 100 are separated, and the support tape 11 in which the unit fastening element 12 is formed in the end portion of the same is separated, so that the runner molding material unit 14 and the gate stick 15 attached to the unit fastening element 12 is removed for thereby fabricating the slide fastener in which various color unit fastening elements 12 are formed on the support tape 11.

Figure 13:
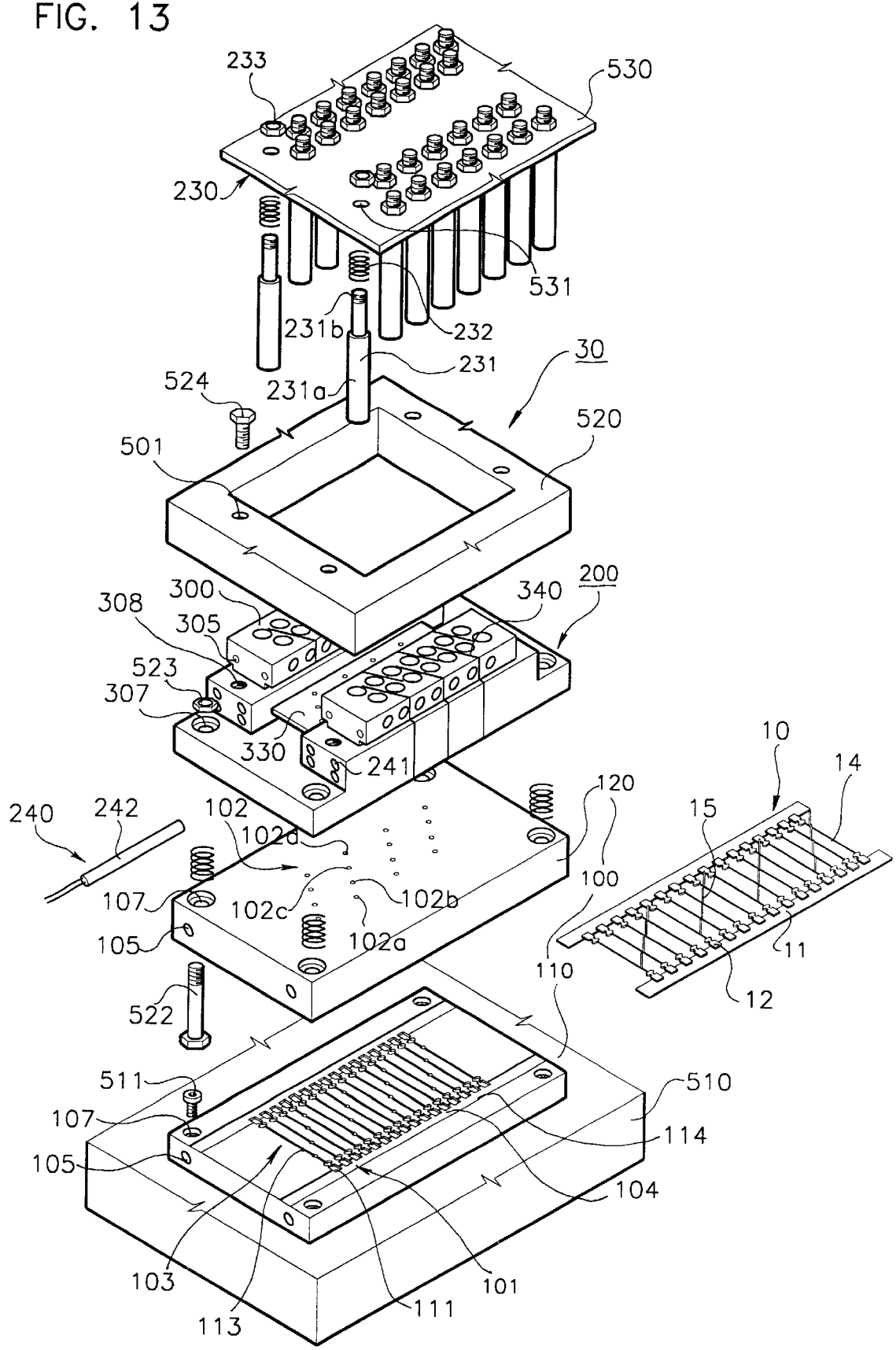
FIG. 13 is an exploded perspective view illustrating a fabrication apparatus according to another embodiment of the present invention.
Figure 14:
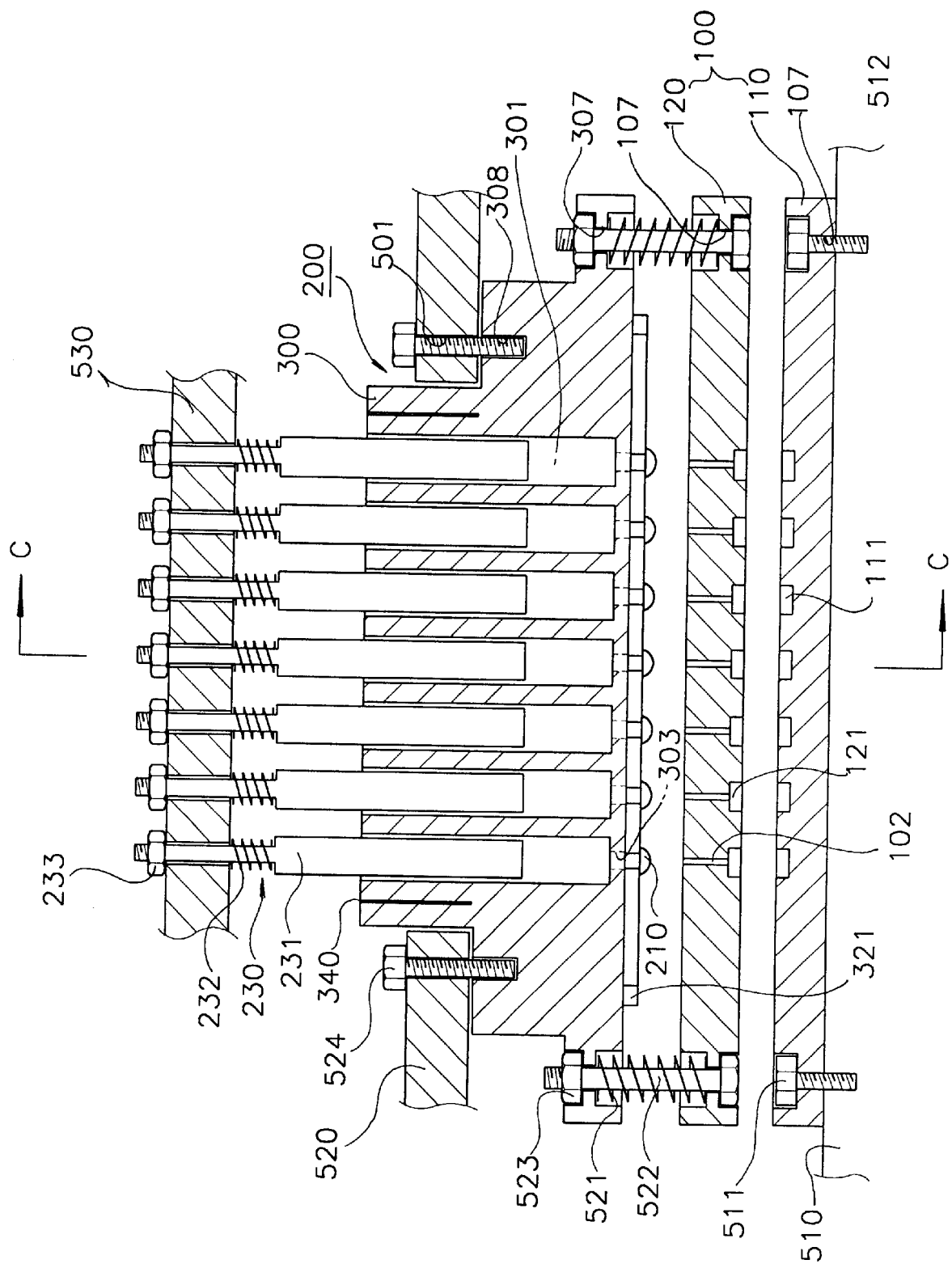
FIGS. 14 and 15 are vertical cross-sectional views taken by cutting the fabrication apparatus in a perpendicular direction.
Figure 15:
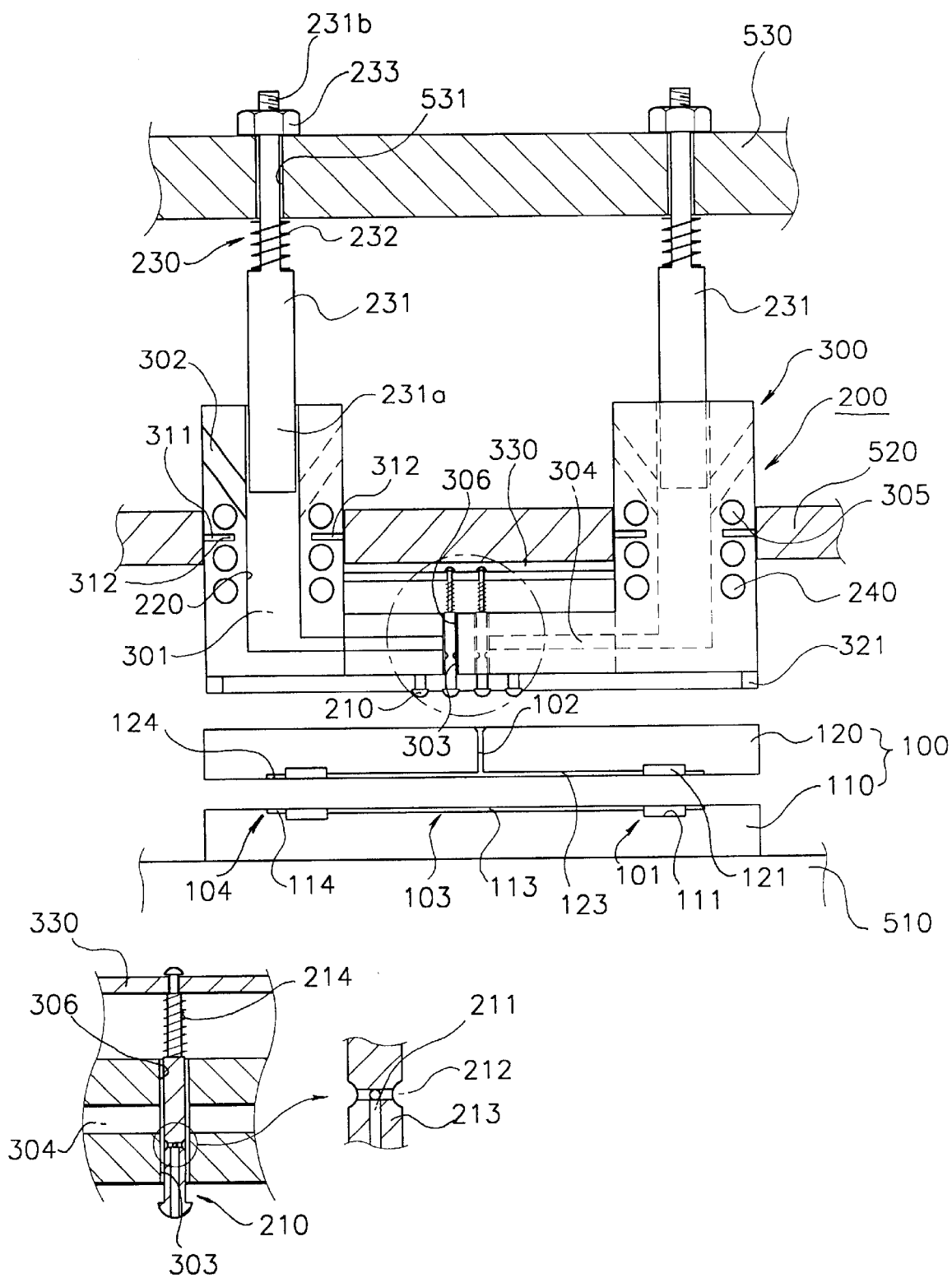
Figure 16:
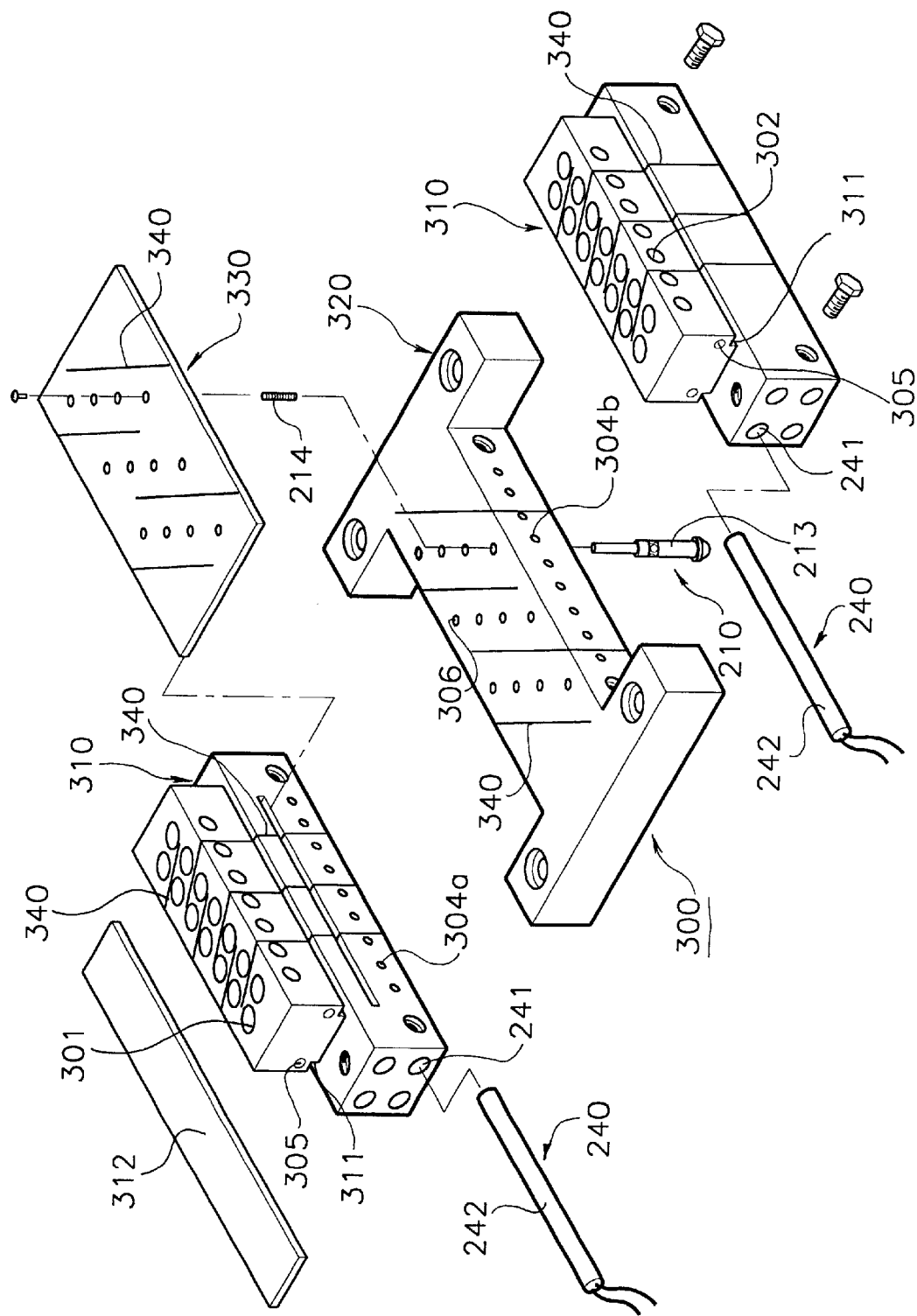
FIG. 16 is an exploded perspective view illustrating a fabrication apparatus according to another embodiment of the present invention.
Figure 17:
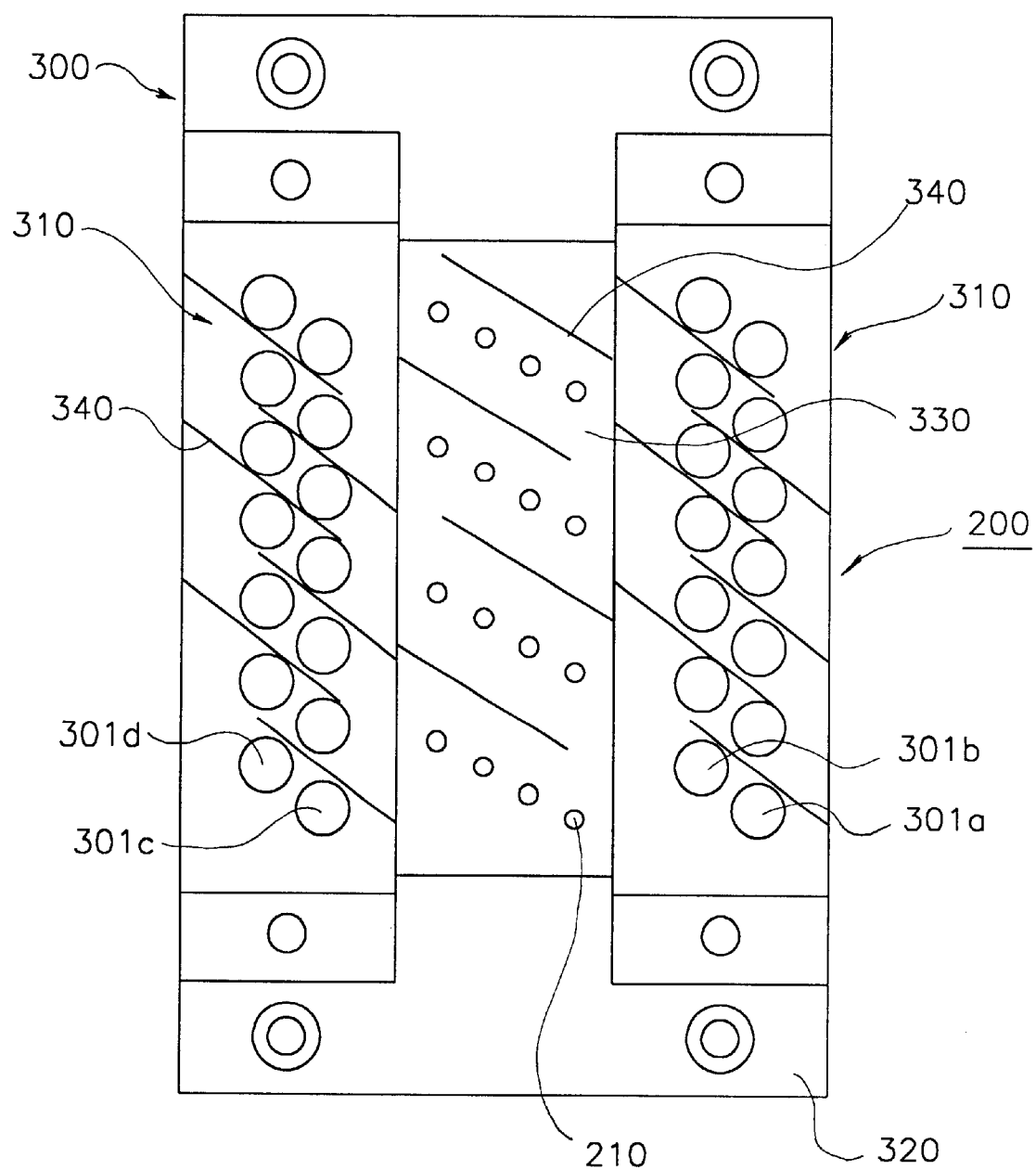
FIG. 17 is a plan view illustrating the fabrication apparatus of FIG. 16.

FIGS. 13 through 17 are views for explaining a color slide fastener fabrication method and apparatus according to another embodiment of the present invention, FIG. 13 is an exploded perspective view illustrating a fabrication apparatus, FIGS. 14 and 15 are vertical cross-sectional views taken by cutting the fabrication apparatus in a perpendicular direction, FIG. 16 is an exploded perspective view illustrating a fabrication apparatus according to another embodiment of the present invention, and FIG. 17 is a plan view illustrating the fabrication apparatus of FIG. 16.

As shown in FIGS. 13 through 15, the color slide fastener fabrication apparatus according to another embodiment of the present invention includes a mold 100 in which the unit fastening element molding material grooves 101 having the same shape as the unit fastening element 12 of the slide fastener are longitudinally formed, and a predetermined number of the unit fastening element molding material grooves 101 communicate each other through the guide groove 103, and the injection port 102 into which the molding material 20 which is a material of the unit fastening element 12 is injected. In addition, there is provided a molding material injection unit 200 in which various color molding materials 20 are filled into the unit fastening molding material groove 101 through the injection port 102 of the mold 100.

The mold 100 includes a lower mold 110 in which a plurality of lower molding material grooves 111 are longitudinally formed at both sides of the upper surface, the lower fastening groove 114 engaged with the support tape 11 are longitudinally formed in the portions of the lower molding material grooves 111, and the lower guide groove 113 connecting the lower molding material grooves 111 are formed in an intermediate portion. There is further provided an upper mold 120 in which a plurality of upper molding material grooves 121 matching with the lower molding material grooves 111 of the lower mold 110 are longitudinally formed at both sides of the lower surface, and an upper fastening groove 124 matching with the lower fastening groove 114 of the lower mold 110 is formed in one side of the upper molding material groove 121, and an upper guide groove 123 matching with the lower guide groove 113 of the lower mold 110 is formed in an intermediate portion of the same, and a plurality of injection ports 102, into which the molding material 20 is injected through the upper guide groove 123, communicate with the upper guide groove 123 and are formed in an upper portion of the same.

As shown in FIGS. 13 through 15, the molding material injection unit 200 according to another embodiment of the present invention includes a molding material injection block 300 in which a plurality of cylinders 301 each having the molding material supply unit 302 are longitudinally formed at both sides to receive various color molding materials 20, and the discharge outlet 303 opposite to the inlet 102 of the mold 100 communicate with the cylinder 301 by the guide groove 304, and an opening/closing element 210 is formed at an end portion of the discharge outlet 303 for controlling the amount of the molding material 20 discharged to the discharge outlet 303 through the guide groove 304, a heating unit 240 for heating the molding material 20 in the cylinder 301 of the molding material injection block 300, and a molding material pressurizing unit 230 for pressurizing the molding material 20 heated by the heating unit 240 into the unit fastening element molding material groove 101 of the mold 100.

The molding material injection block 300 and the upper mold 120 of the mold 100 are elastically engaged by a connection bolt 522 and a nut 523 using a spring 521, and the molding material injection block 300 of the injection molder is fixed to an intermediate pressurizing plate 520, which moves up and down at an intermediate portion, using a fixing bolt 524, and the lower mold 110 is fixed to an upper portion of a base 510 positioned at a lower portion using the fixing bolt 511.

Reference numerals 107, 307, 308, 501, and 512 of FIGS. 13 through 15 represent bolt holes.

The opening/closing unit 210 of the molding material injection block 300 includes a hollow portion 211 formed therein. In addition, a nozzle opening/closing rod 213 having an opening/closing hole 212 communicating with the hollow portion 211 is slidably inserted into a support hole 306 extended to the upper portion of the discharge outlet 303 in the molding material injection block 300 by the spring 214, and an upper portion of the nozzle opening/closing rod 213 is fixed to the support plate 330 fixed to an intermediate upper portion.

The molding material filled in the cylinder 301 of the molding material injection block 300 is injected into the injection port 102 of the mold 100 or is blocked from being injected thereinto as the opening/closing hole 212 of the nozzle opening/closing rod 213 is matched with the guide groove 304 of the molding material injection block 300 or is not matched with the same.

A plurality of heat expanding prevention grooves 340 are formed at a predetermined portion of the molding material injection block 300 for preventing a deformation of the same due to the heat and precisely forming the unit fastening elements 12 at a predetermined pitch interval. A protection shoulder 321 is formed on a lower circumferential surface of the molding material injection block 300 for protecting the nozzle opening/closing rod 213.

FIG. 16 illustrates a modified fabrication apparatus according to the present invention, and FIG. 17 is a plan view illustrating the fabrication apparatus of FIG. 16.

As shown therein, the molding material injection block 300 of the fabrication apparatus according to the present invention includes a pair of cylinder blocks 310 in which a plurality of upper-side opened cylinders 301 vertically installed therein, and a plurality of slanted molding material supply units 302 are formed at an upper portion for supplying powder type molding materials 20 to each cylinder 301, and a guide groove 304a communicating with a lower portion of the cylinder 301 is formed at a lateral lower portion. There is further provided a discharge outlet block 320 in which the lower portion of the same is engaged between the cylinder blocks 310, and the support holes 306 and the discharge outlets 303 are integrally formed in the interior of the same at a portion matching with the injection port 102 of the mold 100, and a guide groove 304b is laterally extended in the interior of the same to communicate the discharge outlet 303 with the guide groove 304a of the cylinder block 310, and the nozzle opening/closing rod 213 of the opening/closing unit 210 is inserted into the support hole 306 and the discharge outlet 303, respectively, and a protection shoulder 321 is formed in a lower circumferential portion for protecting the nozzle opening/closing rod 213. There is further provided a support plate 330 for allowing the nozzle opening/closing rod 213 of the opening/closing element 210 to be elastically supported by the spring 214.

In addition, The powder type molding material 20 is stored in the molding material supply unit 302 of the cylinder block 310, and a molding material supply hopper is separably engaged with the molding material supply unit 302.

The nozzle opening/closing rod 213 of the opening/closing unit 210 disposed in the support hole 306 and the discharge outlet 303 of the molding material injection block 300 and the injection port 102 of the mold 100 contacting with the nozzle opening/closing rod 213 are grouped by a predetermined number and are arranged in zig-zag manner at a predetermined slanted angle or are arranged at a regular interval at a predetermined slanted angle. In addition, the cylinder 301 of the molding material injection block 300 are arranged in zig-zag manner in a predetermined row and column.

In the heating unit 240, a plurality of insertion grooves 241 are longitudinally formed in the cylinder block 310 neighboring with the lower portion of the cylinder 301 of the molding material injection block 300, and a rod-shaped heat conduction unit 242 generating heat is inserted into the insertion groove 241.

The heat conduction unit 242 of the heating unit 240 is preferably formed to be tube-shaped and may be installed on a lateral surface or lower surface of the molding material injection block 300. The heat conduction unit 242 may be cylindrically formed for thereby surrounding the lower portion of the cylinder 301 of the molding material injection block 300.

More than one heat transfer blocking groove 311 is longitudinally formed on both lateral surfaces of the cylinder block 310 below the molding material supply unit 302 of the molding material injection block 300 at a predetermined interval, and more than one cooling water flow path 305 through which cooling water flows is longitudinally formed in the cylinder block 310 between the heat transfer blocking groove 311 and the molding material supply unit 302.

An adiabatic unit 312 having a low heat conduction rate is inserted into the heat transfer blocking groove 311 formed on both lateral surfaces of the cylinder block 310. When the molding material 20 filled in the cylinder 301 is heated by the heat conduction unit 242 of the heating unit 240 installed in the insertion groove 241 of the cylinder block 310 is heated, it is possible to block the heat of the heat conduction unit 242 from being transferred to the upper portion of the cylinder 301 for thereby preventing the molding material 20 connected with the cylinder 301 and the molding material supply unit 302 from being molten, so that it is possible to prevent the molding material 20 molten in the cylinder 301 from being reversely flown to the molding material supply unit 302 and from being grown on the inner surfaces of the cylinder 301 for thereby effectively supplying the molding material 20 to the molding material supply unit 302 of the molding material injection block 300.

In addition, a heat expansion prevention groove 340 is formed in the cylinder block 310, the discharge outlet block 320 and the support plate 330 of the molding material injection block 300 for preventing the expansion of the heat.

The above-described heat expansion prevention unit is installed at a portion where may block the flow of the material or may be deformed due to the expansion of the heat, so that an accurate product is fabricated by injecting the material such as a synthetic resin.

In the molding material pressurizing unit 230, the piston 231 inserted into the cylinder 301 of the molding material injection block 300 moves elastically with respect to the upper pressurizing plate 530 by the spring 232. In the piston 231, the slide support portion 231b inserted into the support hole 531 formed in the upper pressurizing plate 530 is formed at the upper portion of the pressurizing unit 231a inserted into the cylinder 301 of the molding material injection block 300, and the slide support unit 231b inserted into the support hole 531 is engaged with the upper pressurizing plate 530 by a nut 233. In the slide support unit 231b, the both ends of the spring 232 are elastically supported between the lower surface of the upper pressurizing plate 530 and the pressurizing portion 231a of the piston 231.

In the present invention, a technique adapted to the conventional slide fastener fabrication apparatus is used.

The color slide fastener fabrication apparatus according to another embodiment of the present invention will be explained with reference to FIGS. 13 through 17.

The lower mold 110 of the mold 100 is fixed to the base 510 of the injection molder, and the molding material injection block 300 is fixed to the intermediate pressurizing plate 520, and the upper mold 120 of the mold 100 is separably engaged with the lower portion of the molding material injection block 300 using a connection bolt 522 and a nut 523 into which the spring 521 is inserted. In addition, the piston 231 is movably engaged with the upper pressurizing plate 530.

When the support tape 11 is inserted into the lower fastening groove 114 formed in the lower mold 110 of the mold 100 and then is moved to the lower side of the intermediate pressurizing plate 520, the upper mold 120 of the mold 100 engaged with the molding material injection block 300 by the connection bolt 522 and the spring 521 closely contacts with the lower mold 110 fixed to the base 510, so that the support tape 11 is engaged with the lower fastening groove 114 of the lower mold 110 and the upper fastening groove 124 of the upper mold 120.

The molding material injection block 300 moves downwardly, and the nozzle opening/closing rod 213 inserted into the discharge outlet 303 of the molding material injection block 300 closely contacts with the injection port 102 of the upper mold 120 and is upwardly moved, so that the opening/closing hole 212 of the upper mold 213 matches with the guide groove 304 communicating with the cylinder 301 of the molding material injection block 300. At this time, the protection shoulder 321 formed on the lower surface of the molding material injection block 300 closely contacts with the upper portion of the upper mold 120 of the mold 100, so that the intermediate pressurizing plate 520, which is being downwardly moved, is stopped.

Thereafter, when the upper pressurizing plate 530 is downwardly moved, the piston 231 having its upper portion engaged for being moving up and down with respect to the pressurizing plate 530 is inserted into the cylinder 301 of the molding material injection block 300 for thereby pushing the molding material 20 molten by the heating unit 240, so that the molding material 20 flows along the guide groove 304 of the molding material injection block 300 and flows toward the follow portion 211 through the opening/closing hole 212 of the nozzle opening/closing rod 213, and the molding material 20 flown to the hollow portion 211 of the nozzle opening/closing rod 213 is filled into the unit fastening element molding material groove 101 through the injection port 102 of the mold 100 and the guide groove 103.

As shown in FIG. 13, the molding material 20 having a first color filled in the first cylinder 301a of the molding material injection block 300 is inserted into the first injection port 102a of the mold 100, and the molding material 20 of a second color filled in the second cylinder 301b of the molding material injection block 300 is inserted into the second injection port 102b of the mold 100, and the molding material 20 of a third color filled in the third cylinder 301c of the molding material injection block 300 is inserted into the third injection port 102c of the mold 100, and the molding material 20 of a fourth color filled in the fourth cylinder 301d of the molding material injection block 300 is injected into the fourth injection port 102d of the mold 100. Namely, the molding materials 20 filled in the cylinders 301 of the molding material injection block 300 are sequentially injected by the colors into the unit fastening element molding material grooves 101 through the guide groove 304 of the molding material injection block 300, the hollow portion 211 of the nozzle opening/closing rod 213, and the injection port 102 and the guide groove 103 of the mold 100, so that the thusly injected molding materials are engaged with the support tape 11 inserted into the upper and lower fastening grooves 114 and 124 of the mold 100.

At this time, the heating unit 240 of the molding material injection unit 200 changes the molding material 20 filled in the cylinder 301 of the molding material injection block 300 to a liquid or gel state and maintains the molding material 20 to be at a predetermined temperature, so that the molding material 20 is easily moved from the cylinder 301 of the molding material injection unit 200 to the unit fastening element molding material groove 101 of the mold 100. In addition, the spring 232 of the molding material pressurizing unit 230 pressurizes the molding material filled in the cylinder when the piston 231 slidable with respect to the upper pressurizing plate 530 is inserted into the cylinder 301 of the molding material injection block 300.

Thereafter, the molding material 20 filled in the unit fastening element molding material groove 101 of the mold 100 is cooled, and the unit fastening elements 12 engaged with the support tape 11 are hardened. The piston 231 which is pressurizing the molding material 20 in the cylinder 301 o the molding material injection block 300 is removed by upwardly moving the upper pressurizing plate 530. The molding material injection block 300 and the upper mold 120, and the upper mold 120 and the lower mold 110 are separated. After the support tape 11 is separated from the mold 100, and then the runner molding material unit 14 and the gate stick 15 engaged with the unit fastening unit 12 are separated for thereby finishing the fabrication of the slide fastener 10 in which various color unit fastening elements 12 are formed on the support tape 11.

As described above, in the present invention, the unit fastening elements having different colors are sequentially fixed to the support tape of the slide fastener.

In addition, the slide fastener is fabricated in multiple colors and patterns. In the present invention, it is possible to prevent a pattern mismatching portion which occurs in the conventional slide fastener. The design choice range is increased in accordance with the kinds of clothes, bags and portable products.

The unit fastening elements of the slide fastener may be formed by fluorescent substances. Therefore, workers who work in the night can safely work using the unit fastening elements of the slide fastener according to the present invention.

In the present invention, the color slide fastener may be used for various wears such as a sports wear, a ski clothe, a jacket, various products such as a bag, a purse, etc. for thereby meeting the demand of users.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. Apparatus for fabrication of a slide fastener having groups of fastener elements of differing colors comprising: an injection mold having separable parts defining tape grooves between the mold parts for receiving a pair of tapes on which individual fastener elements are to be molded and fastener element cavities spaced along said tape grooves for receiving fluid molding material to form fastener elements on said tapes, said cavities being arranged in groups, molding material injection conduits connected to each cavity in a group, and at least one molding material injection port in fluid communication with each injection conduit in a group whereby said groups of cavities may be connected to means for injecting molding material of different colors into said cavities of said groups, means for injecting molding material into said injection ports comprising a cylinder block in which a plurality of cylinders are provided, each of said cylinders having a molding material inlet and a molding material outlet for supplying molding material to an associated injection port, a piston support block, a piston in each said cylinder to cause molding material to flow from said outlets to said injection ports, said pistons being resiliently connected to said piston support block, and means for moving said piston support block toward said cylinder block to move said pistons into said cylinders.

2. The apparatus of claim 1, further comprising a heater for heating molding material in said cylinder and a cooling fluid passageway in said mold.

3. The apparatus of claim 2, further comprising valve elements in said outlets of said cylinders, said valve elements being engageable with said mold for opening said outlets to permit flow of molding material into said injection ports.

4. The apparatus of claim 3, wherein said valve elements include a stem having a fluid passageway therein and a spring engaged with said stem and said cylinder block for urging said valve elements in a direction to close said outlets.

5. The apparatus of claim 4, further comprising means for heating said cylinders.

6. The apparatus of claim 5, further comprising cooling fluid passageways in said mold.

7. The apparatus of claim 6, further comprising heat expansion prevention grooves in said cylinder block for reducing heat transfer to said molding material inlets.

8. The apparatus of claim 7, further comprising low heat transfer adiabatic material in said grooves.

9. The apparatus of claim 1, further comprising heated guide molding material tubes for delivering molding material from said injectors to said injection ports.

10. The apparatus of claim 1, wherein said injection ports are arranged in zig-zag fashion.

* * * * *